Patented Sept. 26, 1933

1,928,256

UNITED STATES PATENT OFFICE 1,928,256

INSECTICIDE AND PROCESS FOR MAKING THE SAME

Howard A. Jones, Cherrydale, Va., dedicated to the Government and the people of the United States of America No Drawing. Application August 23, 1930
Serial No. 477,482

8 Claims. (Cl. 167—24)

(Granted under the act of March 3, 1883, as amended April 30, 1928; 370 O. G. 757)

This application is made under the act approved April 30, 1928, and the invention herein described, if patented, may be manufactured and used by or for the Government for governmental purposes without payment to me of any royalty thereon.

I hereby dedicate the invention herein described to the free use of the public to take effect upon the granting of a patent to me.

This invention relates to a liquid insecticide containing rotenone in the form of a colloidal dispersion and to a process for producing the same. This process comprises the formation of a solution of rotenone in pyridine, or an analogous water soluble solvent, and the addition of this solution to water.

One object of the invention is to provide a colloidal suspension of rotenone in which the rotenone is in an extremely fine state of subdivision and thus enhances the activity of the rotenone as a insecticide.

Another object of the invention is to provide a suspension of rotenone in water without the use of soap, alkali salts of sulphonated oils or other materials which dissolve in water or are hydrolyzed by water to form an alkaline solution. Rotenone is decomposed by aqueous solutions of alkalies and it is important that it be dispersed in a medium as nearly neutral as possible.

A further object of the invention is to provide a preparation containing rotenone which may be applied in fluid form.

One advantage of the invention is the fine degree of dispersion of the rotenone which will result in a maximum insecticidal effect.

Another advantage of the invention is the simplicity of preparation, since no protective colloid need be added and long continued or violent agitation is unnecessary.

Another advantage of the invention is the fact that the rotenone may be shipped in the form of a concentrated solution in pyridine or an analogous solvent, which then need only be added to water, without any protective colloid, and stirred gently to form a colloidal dispersion.

In attempting to disperse rotenone in water numerous water soluble solvents have been tested. Quite a number of these solvents gave satisfactory suspensions in the presence of a protective colloid, but comparatively few gave colloidal suspensions without the use of any protective material.

Suspensions were made by adding the solution of rotenone in the solvent to be tested to water and mixing gently. Various concentrations of the original solutions have been used and the dilution of the final suspensions has also been varied. In these experiments no protective colloid was used.

The majority of the solvents tested gave a suspension which began to settle within one to two hours and had completely separated in twelve to twenty-four hours. Among the solvents which have been found to act in this way are acetic acid, acetone, diacetone alcohol, ethyl alcohol, ethylene chlorohydrin and formic acid.

A few of the solvents tried, such as ethyl formate and methyl ethyl ketone, gave very poor suspensions, the rotenone beginning to separate out almost as soon as the two liquids were mixed and complete separation occurring within an hour. Both of these solvents have a rather low solubility in water and this would seem to indicate that for the most satisfactory results the solvent used should have a comparatively high solubility in water.

The most satisfactory solvents for obtaining permanent colloidal suspensions of rotenone without the use of a protective colloid are pyridine and the pyridine bases. It was found that pyridine and a-picoline, in the proper concentrations, give colloidal dispersions which remain in suspension almost indefinitely. Thus a suspension made by adding 1 cc. of a 1 per cent solution of rotenone in pyridine to 100 cc. of water (see Example I below) showed no evidence of separation during a period of thirty days.

For satisfactory insecticidal action it will rarely be necessary to use concentrations stronger than 1 gram of rotenone to five or ten liters of suspension. The particular concentrations which give the best dispersions depend on the solvent used. Thus with pyridine the concentration of solvent should not be less than about 1 per cent of the final volume for satisfactory suspensions. Too high a concentration of solvent, on the other hand, may be injurious to foliage. The pyridine solutions of rotenone used to make the suspension may contain from about 1 per cent to 5 per cent rotenone; while the rotenone concentration in the final dilution should not be much greater than 1 gram of rotenone to two liters of suspension. At a concentration of 1 gram of rotenone to one liter the suspension showed separation within a few hours.

In carrying out my invention in practice I have proceeded as follows with successful results:

*Example I.*—1 gram of pure rotenone is dissolved in 100 cc. of pyridine. 1 cc. of this solution is added to 100 cc. of distilled water and shaken gently. A pale opalescent colloidal solution results which shows no evidence of separation over an extended period of time.

*Example II.*—5 grams of pure rotenone is dissolved in 100 cc. of pyridine. 1 cc. of this solution is added to 100 cc. of distilled water and shaken gently. A deeply opalescent colloidal solution results which shows no evidence of separation over an extended period of time.

*Example III.*—1.2 grams of pure rotenone is dissolved in 100 cc. a-picoline. 1 cc. of this solution is added to 100 cc. distilled water and shaken gently. A colloidal solution of medium opalescence results which shows no evidence of separation during a considerable period of time.

In like manner other water-soluble solvents analogous to pyridine may be used with equally successful results.

For example the various methyl pyridines (a-, B- and Y-picolines), the dimethyl, trimethyl, ethyl, allyl and other alkyl-pyridines may be employed in place of pyridine. Similarly the dipyridyls and other compounds containing a pyridine nucleus may be used. These compounds are included under the term "pyridine base".

In place of pure rotenone, a crude rotenone, or an extract of a plant containing rotenone may be used. For example extractives from *Derris elliptica*, Lonchocarpus and other plants known to contain rotenone may be employed.

I claim:

1. An insecticide comprising water, rotenone colloidally dispersed therein, and a small proportion of a pyridine base.

2. An insecticide comprising water, rotenone colloidally dispersed therein, and a small proportion of pyridine.

3. An insecticide comprising water, a plant extract containing rotenone, colloidally dispersed therein, and a small proportion of a pyridine base.

4. An insecticide comprising water, a plant extract containing rotenone, colloidally dispersed therein, and a small proportion of pyridine.

5. A process of producing a liquid insecticide containing rotenone in a colloidal state of dispersion which consists substantially in dissolving the rotenone in a pyridine base and adding this solution to water with subsequent mixing.

6. A process of producing a liquid insecticide containing rotenone in a colloidal state of dispersion which consists substantially in dissolving the rotenone in pyridine and adding this solution to water with subsequent mixing.

7. A process of producing a liquid insecticide containing rotenone in a colloidal state of dispersion which consists substantially in dissolving a plant extract containing rotenone in a pyridine base and adding this solution to water with subsequent mixing.

8. A process of producing a liquid insecticide containing rotenone in a colloidal state of dispersion which consists substantially in dissolving a plant extract containing rotenone in pyridine and adding this solution to water with subsequent mixing.

HOWARD A. JONES.